(12) United States Patent
Kelly et al.

(10) Patent No.: US 6,844,381 B2
(45) Date of Patent: Jan. 18, 2005

(54) MODIFICATION OF SYNDIOTACTIC POLYPROPYLENE WITH MINERAL OIL

(75) Inventors: LuAnn Kelly, Friendswood, TX (US); Joseph M. Schardl, Jr., Cypress, TX (US); Mark B. Miller, Houston, TX (US); Vincent Barre, Seabrook, TX (US); Layne Lumus, Dickenson, TX (US)

(73) Assignee: Fina Technology, Inc., Houston, TX (US)

( * ) Notice: Subject to any disclaimer, the term of this patent is extended or adjusted under 35 U.S.C. 154(b) by 54 days.

(21) Appl. No.: 10/222,551

(22) Filed: Aug. 15, 2002

(65) Prior Publication Data

US 2004/0034148 A1 Feb. 19, 2004

(51) Int. Cl.[7] .............................. C08K 3/26; C08K 3/34; C08K 3/40; C08K 5/01; C08L 95/00
(52) U.S. Cl. ........................... 524/59; 524/62; 524/425; 524/445; 524/451; 524/487; 524/494
(58) Field of Search ........................... 524/59, 62, 425, 524/445, 451, 487, 494

(56) References Cited

U.S. PATENT DOCUMENTS

| | | | | | |
|---|---|---|---|---|---|
| 4,593,062 | A | * | 6/1986 | Puydak et al. | 524/426 |
| 5,157,081 | A | * | 10/1992 | Puydak et al. | 525/237 |
| 5,397,832 | A | * | 3/1995 | Ellul | 524/515 |
| 5,853,435 | A | * | 12/1998 | Avery et al. | 44/341 |
| 6,086,858 | A | * | 7/2000 | McEleney et al. | 424/59 |
| 6,147,160 | A | * | 11/2000 | Wang et al. | 525/106 |
| 6,653,385 | B2 | * | 11/2003 | Wang et al. | 524/425 |

OTHER PUBLICATIONS

Friction, Lubrication, and Wear Technology, ASM Handbook, vol. 18, Mar. 1995, see:□□under "Forming of Non-ferrous Metals", section titled "Lubricants".*

* cited by examiner

*Primary Examiner*—Nathan M. Nutter
(74) *Attorney, Agent, or Firm*—Madan, Mossman & Sriram P.C.

(57) ABSTRACT

Syndiotactic polypropylene blends having a unique set of mechanical properties may be prepared by blending syndiotactic polypropylene with a high molecular weight mineral oil, an ultra low density polyethylene, or both. The syndiotactic polypropylene blends of the present invention have been found to have reduced flexural modulus, reduced haze, improved impact strength and shorter injection molding cycle times. It has been determined that the addition of about 5 to about 10 percent high molecular weight mineral oil to a syndiotactic polypropylene can decrease flexural modulus values by about 25 to about 30 percent. Moreover, the addition of up to about 10 percent mineral oil to the syndiotactic polypropylene material does not show signs of bleeding or impair clarity, in fact, percent haze values are slightly improved with the addition of mineral oil. Additionally, injection molding cycle time optimization shows an improvement of about 12 seconds in overall cycle time utilizing a syndiotactic polypropylene blend with 5% mineral oil in comparison to a syndiotactic polypropylene without mineral oil. The syndiotactic polypropylene blends according to the present invention may be further processed according to accepted practices to make cast films, blown films, injection molded parts, blow molded containers, and other articles using basic plastics fabrication techniques as known in the art.

7 Claims, 4 Drawing Sheets

MODIFICATION OF SYNDIOTACTIC POLYPROPYLENE WITH MINERAL OIL

CROSS-REFERENCE TO RELATED APPLICATIONS

This application is related to commonly owned U.S. patent application Ser. No. 10/222,552, entitled "Clear Impact-Resistant Syndiotactic Polypropylene", filed on the same date as the present application and incorporated by reference herein.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to syndiotactic polypropylene blends having a high degree of flexibility and good optical clarity. More particularly, the present invention relates to a syndiotactic polypropylene (sPP) which has been blended with a high molecular weight mineral oil (MO), an ultra low density polyethylene (ULDPE), or both. Additionally, the syndiotactic polypropylene blend of the present invention may be subsequently formed into films, sheets, molded articles or the like.

BACKGROUND OF THE INVENTION

Polypropylene materials, formed by Ziegler-Natta or metallocene catalysts, are among the most versatile and commonly used thermoplastics in the world today. Polypropylene materials are useful in creating a great variety of finished goods including cast and blown films, injection molded parts, blow molded articles, thermoformed sheets, and fibers which may be subsequently spun or woven to create carpet and other finished goods. Although both polyethylene and polypropylenes are types of polyolefins, polypropylenes tend to be stiffer and exhibit higher yield stresses and melting points in comparison with polyethylenes but are also more prone to fracture, especially at low temperatures. This primarily results from higher glass transition temperatures, and may be addressed by producing a toughened blend using rubber or other polymeric impact modifiers to improve low temperature impact resistance at some sacrifice in modulus.

As noted earlier, nearly all commercial grade polypropylenes are produced using either Ziegler-Natta or metallocene catalyst mechanisms. These catalysts allow a certain degree of control in regard to the polypropylene's tacticity or arrangement of methyl groups extending from the carbon chain backbone of the finished polymer. A polypropylene molecule having a random arrangement of these pendant groups would be known as atactic. Whereas a polypropylene chain which always located the pendant group on the same side of the chain or in the same orientation would be known as isotactic, and one in which the pendant group alternated from one side of the chain to the other in a repeating pattern would be referred to as syndiotactic.

Traditionally, commercial polypropylenes have been isotactic as these tend to exhibit greater strength and stiffness in the finished product. However, relatively recent innovations in catalyst chemistry have enabled relatively large scale operations for the production of syndiotactic polypropylene. Although not as strong or as stiff as isotactic polypropylenes, syndiotactic polypropylenes offer a unique set of properties including greater flexibility, higher resistance to impact, and superior optical clarity.

There are a number of unique applications which are ideally suited to strong, flexible, and substantially clear polyolefins. By way of example only, plasticized polyvinyl chloride (PVC) has traditionally been used either alone or with other polymer components to form a number of medical articles including bandages, surgical dressings, and intravenous (IV) solution bags. Plasticized PVC films possess many desirable properties including easy stretch, high degree of recovery, low fatigue and minimal permanent set. However, plasticized PVC film has become less desirable because of known or suspected carcinogens associated with both the PVC monomer and the various plasticizers used in its production. Clearly, in medical articles, food storage containers, and other applications where polymers are either in direct contact with blood or other bodily fluids or in contact with food or other items which are to be ingested or taken into the body, it would be desirable to replace materials like plasticized PVC film with various polyolefins, particularly those with very low extractable contents.

Although syndiotactic polypropylene offers superior strength and optical clarity in comparison with less expensive polyolefins, namely polyethylene, sPP homopolymer is typically too stiff to be used in applications where softness or drapeability are critical factors. Additionally, because syndiotactic polypropylene does not crystallize as rapidly as isotactic polypropylene, it is somewhat less processable because molded articles require longer periods of time being held in injection molds or the like to retain their shape and ensure proper dimensional stability. Accordingly, there is a need for syndiotactic polypropylene blends which offer reduced stiffness, improved optical clarity, reduced injection molding cycle times and improved toughness.

SUMMARY OF THE INVENTION

Syndiotactic polypropylene blends prepared in accordance with the present invention address the needs set forth hereinabove and present a rather unique set of mechanical properties by blending syndiotactic polypropylene with a high molecular weight mineral oil, an ultra low density polyethylene, or both. In short, the syndiotactic polypropylene blends of the present invention have been found to have reduced flexural modulus, reduced haze, improved impact strength and shorter injection molding cycle times.

More specifically, it has been determined that the addition of about 5 to about 10 wt % of a high molecular weight mineral oil to a syndiotactic polypropylene can decrease flexural modulus values by about 25 to about 30 percent. Moreover, the addition of up to about 10 percent mineral oil to the syndiotactic polypropylene material does not show signs of bleeding or impair clarity, in fact, percent haze values are slightly improved with the addition of mineral oil. Additionally, injection molding cycle time optimization for a food container having a 2.4 mm wall thickness shows an improvement of about 6 seconds or about 13% in overall cycle time utilizing a syndiotactic polypropylene blend containing 5% mineral oil in comparison to a syndiotactic polypropylene without mineral oil.

It is further within the scope of the present invention to provide a method of making syndiotactic polypropylene blends offering reduced stiffness and improved optical clarity. This may be done by providing a syndiotactic polypropylene material in the form of pellets or fluff and mechanically compounding or blending this material with a high molecular weight mineral oil, and ultra low molecular weight polyethylene or both. This compounding step may be carried out by tumble blending the sPP fluff with mineral oil and/or ULDPE and subsequently feeding this mixture into an extruder or the like to mechanically shear the components into a fairly uniform molten polymer blend. Following extrusion, the syndiotactic polypropylene blends according to the present invention may be further processed according to accepted practices to make cast films, blown films, co-extruded films, laminated sheets, injection molded parts, blow molded containers, and other articles using basic plastic fabrication techniques as known in the art.

BRIEF DESCRIPTION OF THE DRAWINGS

The present invention will be better understood in view of the detailed description in conjunction with the following drawings in which like reference numbers refer to like parts in each of the figures, and in which.

DETAILED DESCRIPTION OF THE PREFERRED EMBODIMENTS

Figure 1:
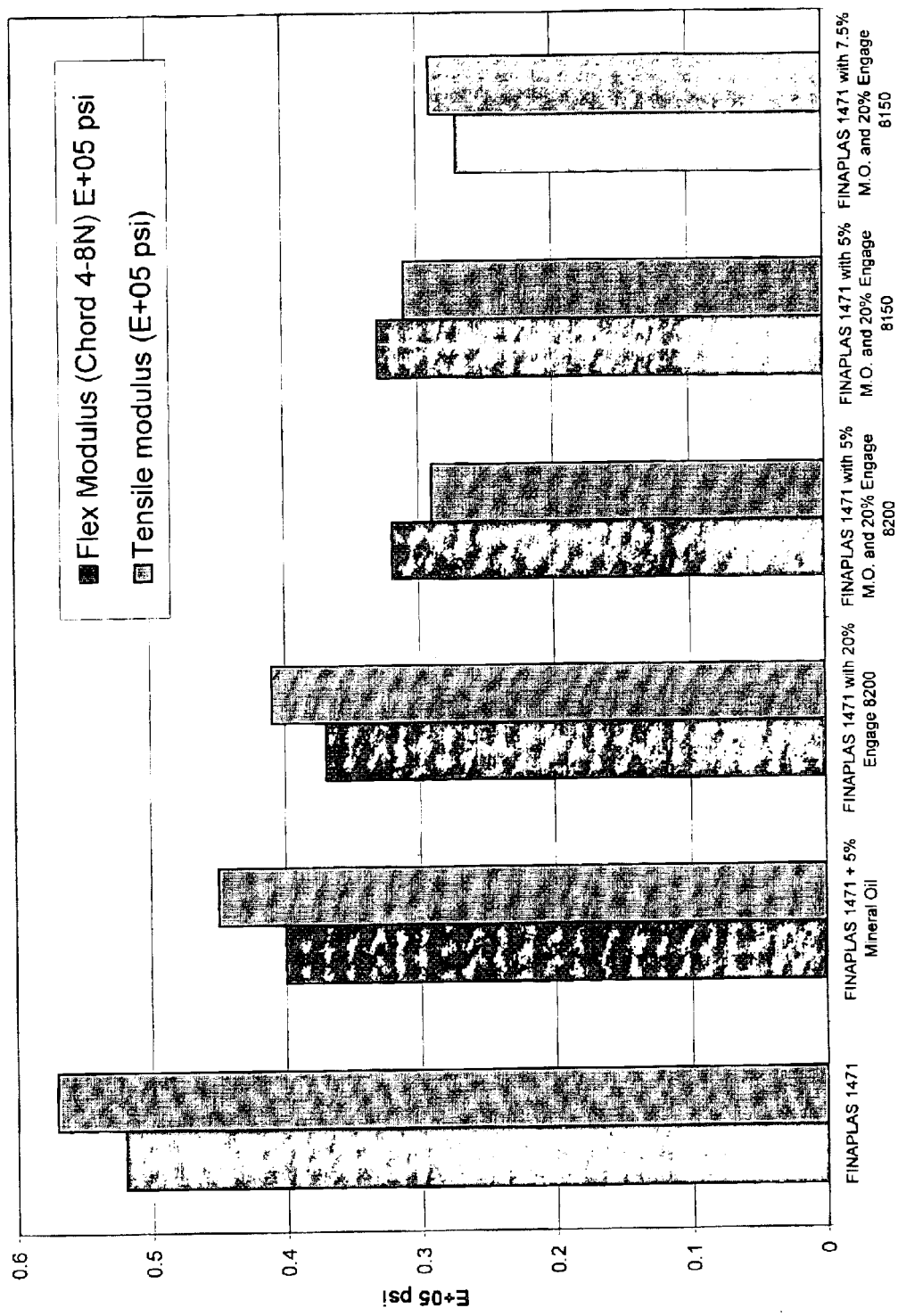
FIG. 1 is a bar graph representation of flexural modulus data for several exemplary syndiotactic polypropylene blends prepared in accordance with the present invention.

Syndiotactic polypropylene blends produced in accordance with the present invention may be used as a single layer or as a component in a multiple layer structure which will result in the production of films that exhibit unique softness, flexibility and resiliency. The films produced from these blends are also expected to withstand sterilization techniques, including gamma radiation that makes them suitable for use in medical packaging. In addition, these materials may be used to manufacture articles with improved flexibility or softness and improved radiation resistance via injection molding, thermoforming and other basic plastic fabrication techniques as known to those skilled in the art.

In accordance with the present invention, the use of mineral oil in an sPP blend will be shown to decrease flexural modulus by up to 30% while retaining or slightly improving optical clarity. It will also be shown that sPP blends containing mineral oil may exhibit reduced cycle times in injection molding applications in comparison to sPP blends without mineral oil. The sPP blends containing mineral oil also offer increased elongation at break properties. Moreover, further enhancement to the mechanical toughness or impact properties of the sPP blends may be made with the addition of ultra low density metallocene polyethylenes, both with and without the use of mineral oil.

Other attempts have been made to produce highly flexible or drapeable polypropylene materials. One such approach was commercialized by Huntsman-Chemical by tightly controlling the degree of crystallinity within the polypropylene material and producing several highly flexible polymers sold under the REXFLEX tradename. However, at this time, these materials have been discontinued and are no longer commercially available. Accordingly, there is still a need within the market to produce conformable polypropylene blends which offer good optical clarity.

According to the present invention, it will be shown that the addition of mineral oil to syndiotactic polypropylene can decrease flexural values by 25 to 30 percent with the addition of about 1% to about 10% mineral oil content by weight. The addition of mineral oil to syndiotactic polypropylene in amounts of up to about 10 wt % does not show signs of bleeding out of the material nor does it appear to impair optical clarity. In fact, percent haze values are slightly reduced with the addition of mineral oil to the sPP material. Impact values and differential scanning calorimetry (DSC) values remain comparable while melt flow rate (MFR) is increased somewhat with the addition of mineral oil. Additionally, it will be demonstrated that cycle time optimization shows an improvement in overall cycle times for injection molding processes by using sPP blends which contain mineral oil in comparison to sPP blends which do not.

The experimental compounds produced in accordance with the present invention were made using a syndiotactic polypropylene, FINAPLAS 1471 (4.1 grams per 10 minutes melt flow rate) available from ATOFINA Petrochemicals of LaPorte, Tex., blended with Drakeol Supreme mineral oil (viscosity of 114.4 centistokes @100° F.) available from Penreco of Karnes City, Pa., at varying concentrations ranging between 1 and 10 wt %. However, it is believed that other high molecular weight mineral oils having viscosities of about 20 to about 3000 Saybolt Universal Seconds (SUS) at 100° F. measured according to ASTM D445 would also be suitable for producing sPP blends in accordance with the present invention. Optionally, an ultra low density polyethylene such as ENGAGE 8150 or ENGAGE 8200, both available from DuPont Dow Elastomers of Wilmington, Del., may also be incorporated into the sPP blend for additional low temperature toughness and other favorable characteristics. These syndiotactic polypropylene blends were subsequently injection molded into step chips, tensile bars, Izod bars and plaques for physical testing. The primary objective of these experiments was to reduce flexural modulus values while retaining good optical clarity in the polymer.

It should be noted that FINAPLAS 1471 will be referred to throughout this document as an sPP homopolymer, but it is in fact a random copolymer of sPP with a very small amount of ethlylene. The ethylene content of FINAPLAS 1471 is less than about 1 wt % of the total polymer composition and as such it behaves very much like an sPP homopolymer in regard to most physical properties. However, the melt temperature ($T_m$) of this material is slightly less than that required by FDA regulations (see 21 CFR 177.1520) for a pure sPP homopolymer. Although referring to FINAPLAS 1471 as an sPP homopolymer, it is believed that the modification of sPP with mineral oil according to the present invention may be accomplished with pure sPP homopolymer or with copolymers of sPP containing ethylene or various alpha olefin monomers ranging from C4 to C12 up to about 10 wt %, but preferably less than about 1 wt %. The sPP materials selected should have densities in a range of about 0.85 to about 0.90 g/ml and melt indices of about 0.1 to about 100 g/10 min. Unless noted to the contrary, the term sPP homopolymer will be understood to include both pure sPP homopolymers and sPP copolymers containing less than about 1 wt % of various alpha olefins. Likewise, ULDPE is also understood to be an ethylene copolymer having densities in a range of about 0.85 to about 0.93 g/ml and melt indices of about 0.25 to about 50 g/10 min. Accordingly, other very low density ethylene copolymers or plastomers having these physical attributes will be considered ULDPE materials as defined herein.

During the initial stages of experimentation, there were concerns that the mineral oil component of the blend might bleed out of the polymer. To determine blend stability, the compounds were mixed and extruded into a thin film using a Randcastle Microtruder to determine if any sort of bleeding was apparent on a film within several days. The films did not show any bleeding, and additional compatibility were carried out in accordance with the guidelines of ASTM 3291-97 to further determine the bleeding potential of the mineral oil. In these tests, Izod bars were molded from the syndiotactic polypropylene blend containing mineral oil and subsequently bent in half and placed into a clamp where they were held for varying periods of time including 4 hours, 24 hours, and 7 days. At the end of these time periods, the bars were folded in the opposite direction and checked for bleeding of the mineral oil by wiping with a tissue. At concentrations of 5 and 10 percent mineral oil, the samples tested did not produce any mineral oil residue after 7 days. Accordingly, it would appear that the mineral oil in these concentrations tends to stay in the polymer and does not migrate to the surface or produce residues which may be problematic during injection molding processes or subsequent use of finished articles.

As will be discussed in greater detail hereinbelow, the sPP blends containing mineral oil appear to offer the added benefit of acting as a sort of release agent in injection molding processes thereby decreasing cycle times. However, because mineral oil stays in the blend without significant surface migration, the sPP blends containing mineral oil are actually superior to the use of traditional release agent sprays because the blends produced in accordance with the present invention do not appear to leave any residue on the surface of the part or the mold itself.

Further physical property determinations were carried out using traditional injection molded tensile and Izod testing bars. It was hoped that sPP would become more flexible with the addition of mineral oil and, optionally, the addition of an ultra low density polyethylene such as ENGAGE 8150 and ENGAGE 8200 available from Dow Dupont Chemicals.

Referring now to FIG. 1, flexural and tensile modulus data are shown in bar graph form for a number of exemplary sPP blends. The flexural modulus was measured according to ASTM D790 and the tensile modulus was measured according to ASTM D638. Both of these tests were conducted at room temperature. It is notable that by adding either 5 wt % mineral oil or 20 wt % ULDPE to the sPP material, it is possible to significantly reduce both the flexural and tensile modulus of the materials in comparison to control bars of pure sPP material. However, further reductions in modulus values and greater softness may be achieved by combining the benefits of both 5 wt % mineral oil and 20 wt % ULDPE.

As shown in FIG. 1, sample bars containing 5 wt % mineral oil and 20 wt % of either ENGAGE 8200 or ENGAGE 8150 result in flexural and tensile modulus values which are significantly reduced over the addition of either mineral oil or ENGAGE polymer individually. It is also notable that a test bar prepared with 7.5 wt % mineral oil and 20 wt % of ENGAGE 8150 material also exhibited reduced flexural and tensile modulus values, but these results were only slightly better than those achieved with 5 wt % mineral oil and 20 wt % of ENGAGE 8150. Accordingly, it is believed that this unique combination of mineral oil and ULDPE additives in an sPP blend may be used to produce sPP blends having far superior softness and feel in comparison with syndiotactic polypropylene homopolymers.

Figure 2:
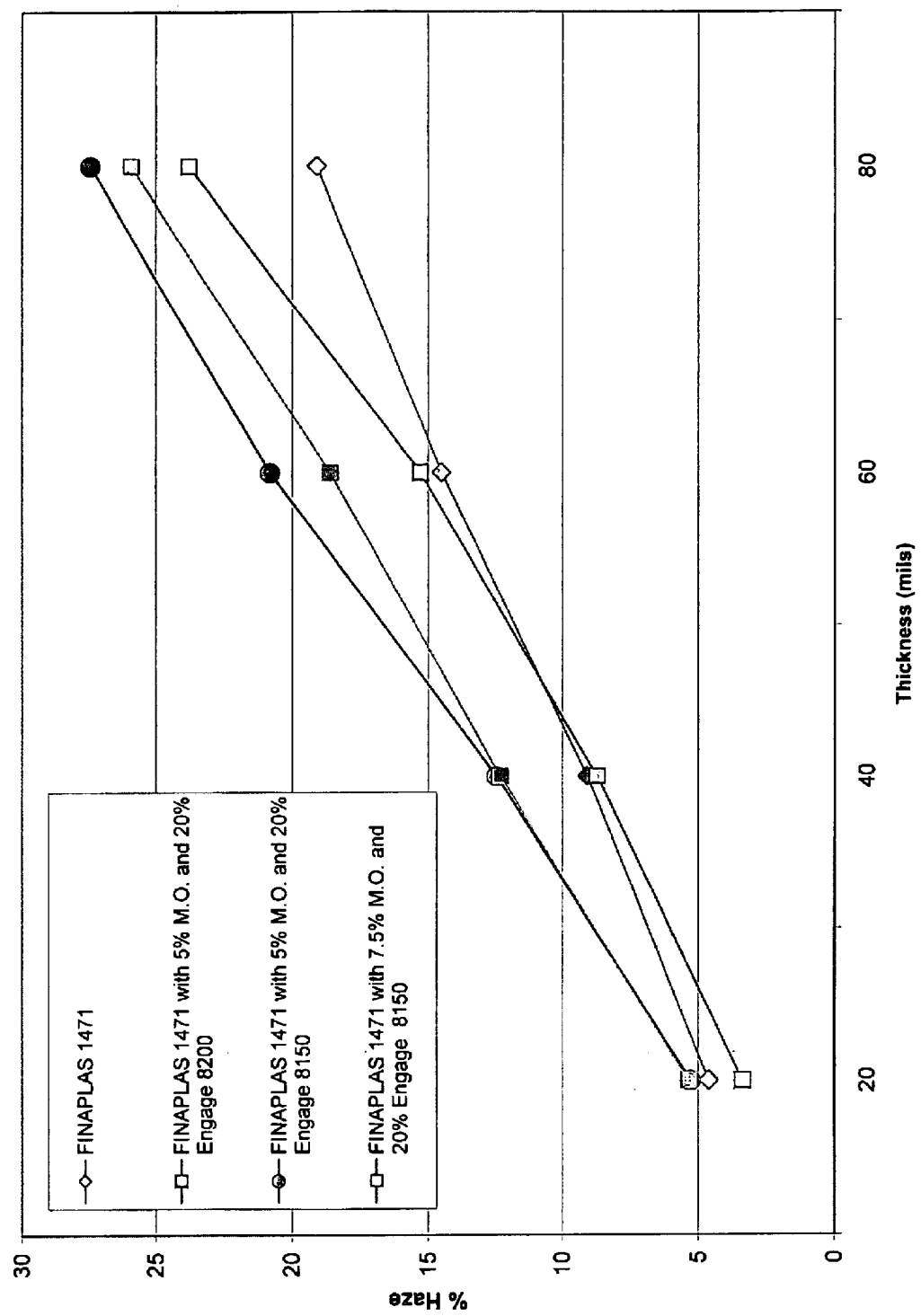
FIG. 2 is a line graph showing percent haze vs. test plaque thickness for several exemplary syndiotactic polypropylene blends prepared in accordance with the present invention.

As noted earlier, optical clarity is also an important property of syndiotactic polypropylene blends, particularly in medical and food related applications. Optical clarity may be measured by molding a series of step chips having various thicknesses, namely 20, 40, 60 and 80 mils (1 mil=0.001 inch), and measuring the percent haze value according to ASTM D1003. Referring now to FIG. 2, percent haze data is shown in line graph form for a number of exemplary sPP blends. As shown here, the control sample of pure sPP polymer has a fairly linear plot ranging from about 5% to about 18% haze as the step chips increase in thickness from 20 mils to 80 mils. It is notable, however, that samples containing about 5 wt % mineral oil or 20 wt % ENGAGE 8200 ULDPE exhibit consistently lower percent haze values than the control samples.

As shown in FIG. 2, particularly in thinner samples of about 20 to 40 mils, step chips containing both 5 wt % mineral oil and 20 wt % ENGAGE 8200 exhibit lower haze percentages than the control materials. This is important in manufacturing either single layer sPP blend films or co-extruded multi-layer films in which the sPP blend material is desired to contribute particular mechanical properties. As noted earlier, strong, chemically resistant, low extractable films which offer good optical clarity are particularly useful in medical and food related applications in which it is desirable to visually inspect the contents wrapped or sealed in the polymer film. Clearly, thin sPP blend films having thicknesses of less than 20 mils and haze percentage of about 3% or less would be ideally suited for these applications. As shown here, limited amounts of mineral oil and ULDPE may be added to sPP materials to increase softness and drapeability of resulting films while actually improving optical clarity.

Figure 3:
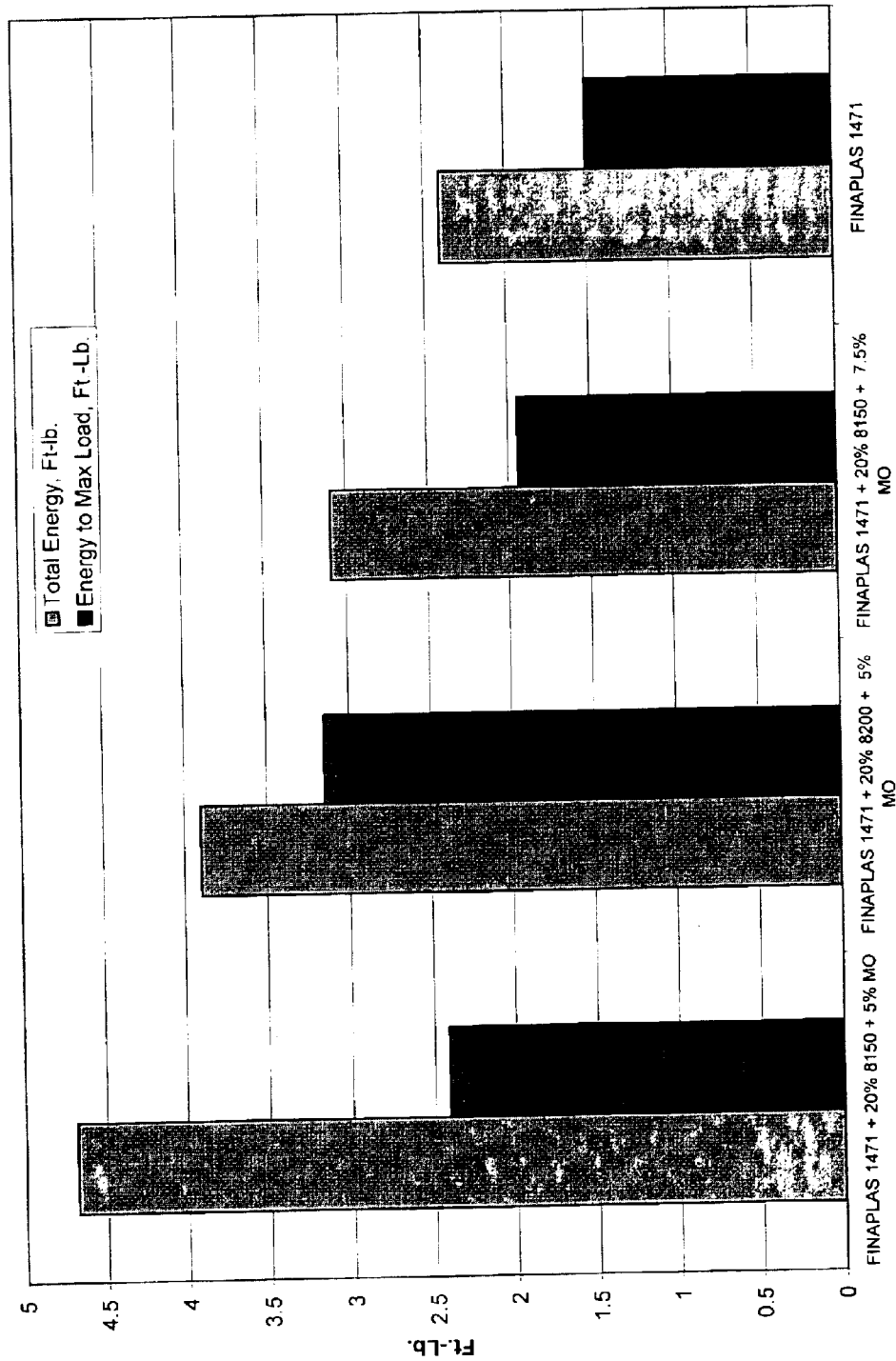
FIG. 3 is a bar graph representation of cold temperature instrumented impact data for several exemplary syndiotactic polypropylene blends prepared in accordance with the present invention.

Referring now to FIG. 3, cold temperature instrumented impact data are presented in bar graph form for a number of exemplary sPP blends. This testing was carried out according to ASTM D3763 and conducted at a temperature of −20° F. As shown here, the control sPP homopolymer samples are indicated as FINAPLAS 1471 and are shown on the right hand portion of the graph. These samples exhibited total energy values ranging from just under 2.5 ft-lbs. to just over 3.0 ft-lbs. of energy. The sample featuring 7.5 wt % mineral oil and 20 wt % ENGAGE 8150 ULDPE exhibited similar impact energy values as the sPP homopolymer materials. However, the samples prepared with 5 wt % mineral and 20 wt % of either ENGAGE 8150 or ENGAGE 8200 showed a marked improvement in impact energy values. Specifically, the samples containing ENGAGE 8150 resulted in a total energy value in excess of 4.5 ft-lbs. and the samples containing ENGAGE 8200 exhibited values of just less than 4.0 ft-lbs. Although these increases may seem rather small in magnitude, it is notable that any increase in cold temperature (−20° F.) instrumented impact values for sPP materials would be useful and that the addition of mineral oil and ULDPE to the sPP polymers also contributes improvements in softness and optical clarity to the blend.

Figure 4:
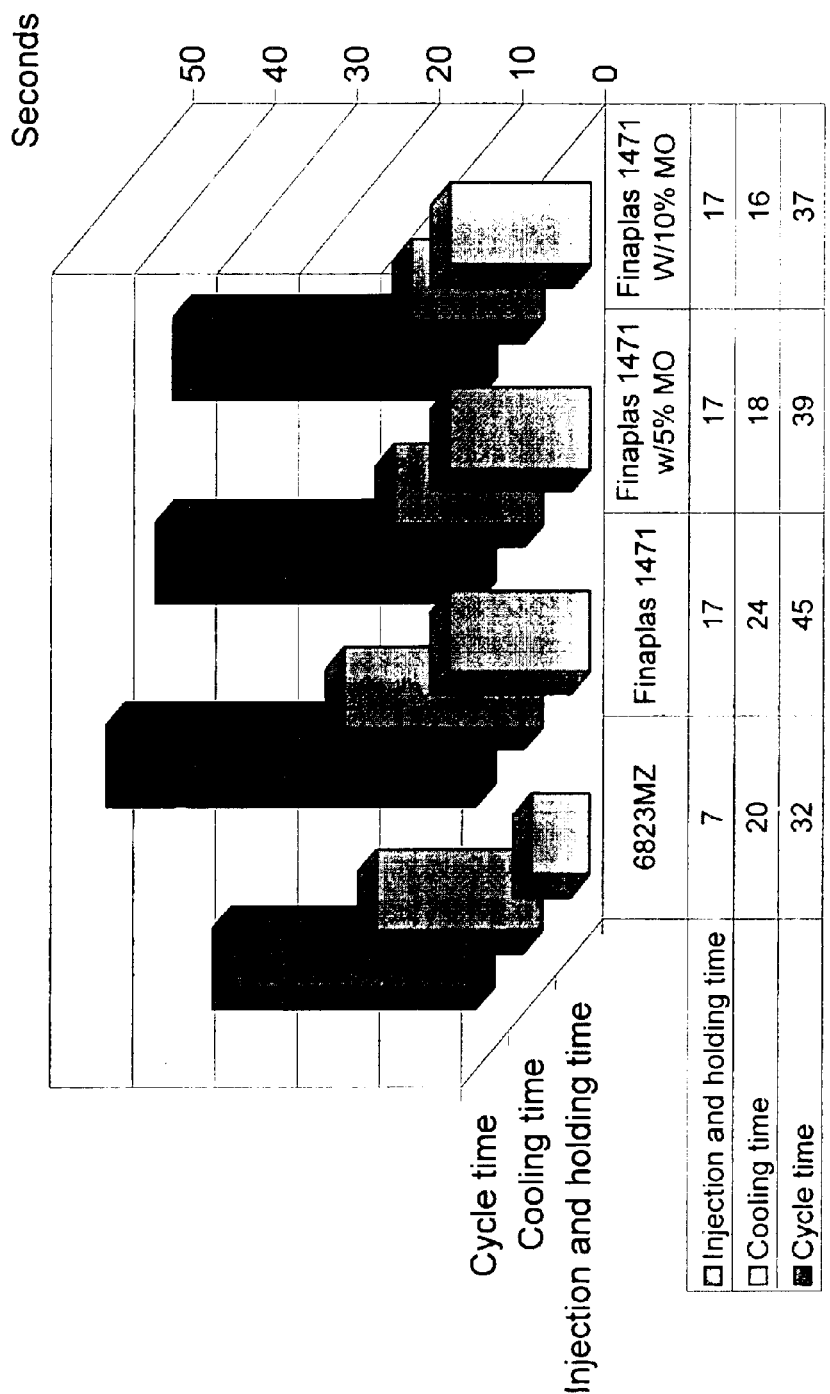
FIG. 4 is a three-dimensional bar graph representation of holding times, cooling times, and total cycle times for injection molded parts formed from several exemplary blends of syndiotactic polypropylene prepared in accordance with the present invention.

Referring now to FIG. 4, it can also be shown that the addition of mineral oil and ULDPE to sPP polymers may also result is significant improvements in manufacturing efficiency as well as the mechanical property improvements discussed hereinabove. As shown here, there are two control samples on the left-hand portion of the bar graph. The first of these is designated as 6823 MZ and this represents an isotactic polypropylene (iPP) random copolymer of about 98 wt % polypropylene with about 2 wt % ethylene catalyzed using a Ziegler-Natta process. This material is believed to be a suitable example of a commercially accepted material for injection moldable polypropylene parts. The second control sample shown here is designated as FINAPLAS 1471 and is a syndiotactic polypropylene homopolymer.

As shown on the right-hand portion of FIG. 4, the sPP polymer has been blended with either 5 or 10 wt % mineral oil. As expected, the polypropylene copolymer exhibits significantly shorter cycle times than the sPP homopolymer. This is largely the result of longer injection and holding times to attain dimensional stability in the molded part and longer cooling times to allow the part to solidify sufficiently to be removed from the mold. While still requiring about 10 seconds of additional holding time, the samples containing 5 wt % or 10 wt % mineral oil offer significantly reduced cooling times in comparison with sPP homopolymer and offer injection molding cycle times which are only slightly longer than that of the 6823 MZ isotactic polypropylene random copolymer.

It is believed that by incorporating mineral oil into the sPP blend the molded parts tend to come away from the mold more readily than those formed of sPP homopolymer. The mineral oil incorporated into the blend appears to act as a mold release agent without migrating out of the polymer or coating the mold or the part with an undesirable residue. Traditional mold release usually consists of an oily spray which tends to coat the mold and the resulting parts with a residue which may inhibit further processing steps such as printing or labeling. In short, by preparing blends in accordance with the present invention, it is possible to produce materials having significantly improved softness and feel, improved optical clarity, improved low temperature impact strength, and commercially viable cycle times in typical injection molding manufacturing processes.

While a preferred embodiment of the invention has been shown and described herein, modifications may be made by one skilled in the art without departing from the spirit and the teachings of the invention. The embodiments described herein are exemplary only, and are not intended to be limiting. Many variations, combinations, and modifications of the invention disclosed herein are possible and are within the scope of the invention. Accordingly, the scope of protection is not limited by the description set out above, but is defined by the claims which follow, that scope including all equivalents of the subject matter of the claims.

What we claim as our invention is:

1. A thermoplastic polymer blend consisting essentially of:
   a syndiotactic polypropylene homopolymer; and
   a high molecular weight mineral oil.

2. A thermoplastic polymer blend according to claim 1, wherein the high molecular weight mineral oil has a viscosity of about 20 to about 3000 SUS at 100° F. measured according to ASTM D445.

3. A thermoplastic polymer blend according to claim 1, wherein the high molecular weight mineral oil comprises less than about 20 wt % of the polymer blend.

4. A thermoplastic polymer blend according to claim 3, wherein the high molecular weight mineral oil comprises about 1 to about 10 wt % of the polymer blend.

5. A thermoplastic polymer blend according to claim 3, wherein the high molecular weight mineral oil comprises about 3.0 to about 7.5 wt % of the polymer blend.

6. A thermoplastic polymer blend according to claim 3, wherein the high molecular weight mineral oil comprises about 4.5 to about 5.5 wt % of the polymer blend.

7. A thermoplastic polymer blend according to claim 1, wherein a 20 mil plaque formed of said blend will have less than about 5% haze.

* * * * *